Sept. 21, 1943.  R. M. NARDONE  2,329,929
ENGINE STARTING MECHANISM
Original Filed Sept. 13, 1940  3 Sheets-Sheet 1

INVENTOR
Romeo M. Nardone
By Martin J. Finnegan
ATTORNEY

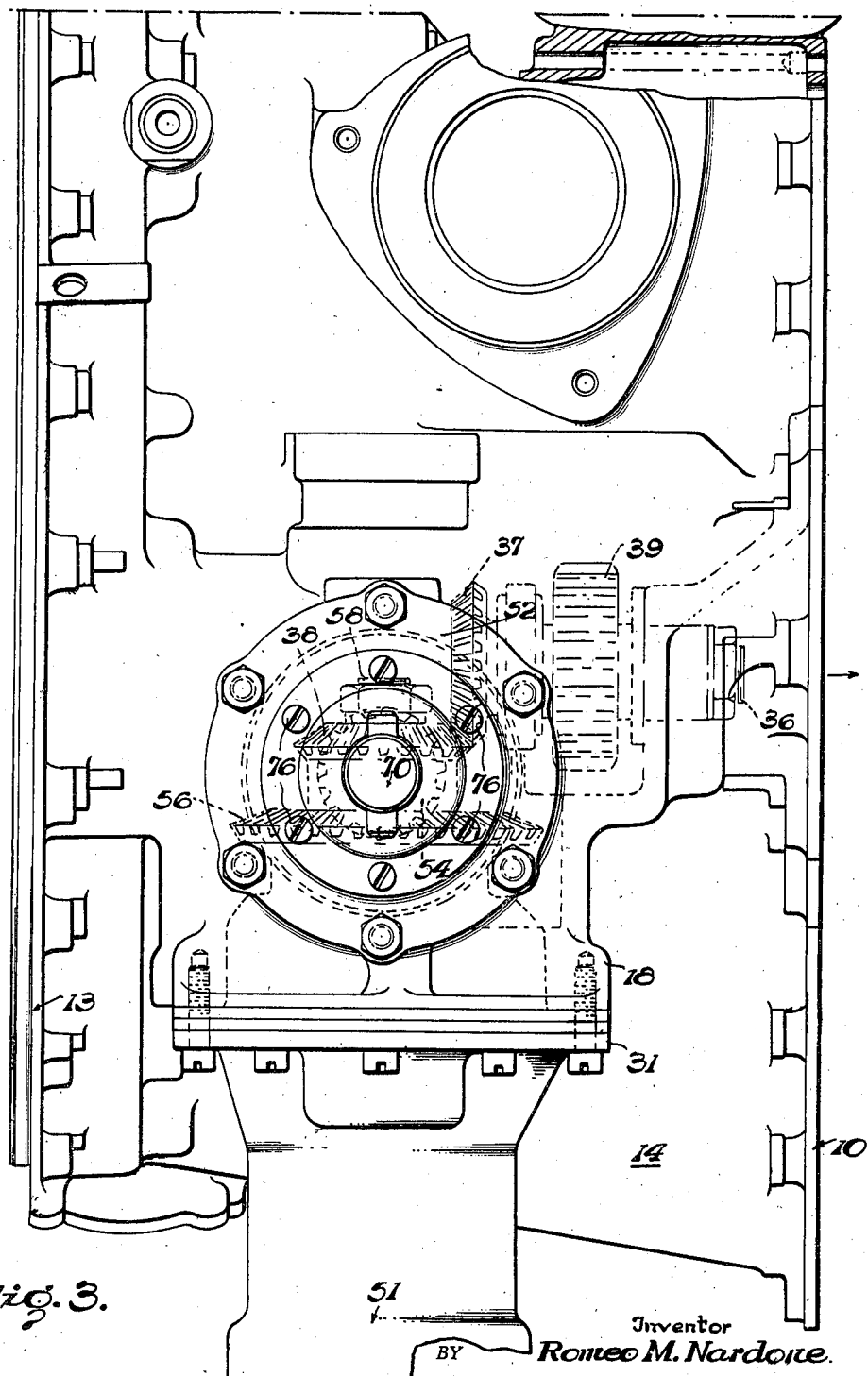

Patented Sept. 21, 1943

2,329,929

UNITED STATES PATENT OFFICE 2,329,929

ENGINE STARTING MECHANISM

Romeo M. Nardone, Westwood, N. J., assignor to Bendix Aviation Corporation, Bendix, N. J., a corporation of Delaware Substituted for abandoned application Serial No. 356,708, September 13, 1940. This application December 23, 1942, Serial No. 469,969

1 Claim. (Cl. 123—179)

This invention relates to starting mechanism for internal combustion engines, and particularly, for engines installed in locations where the amount of free space available is so limited as to preclude the possibility of using a starting mechanism of conventional dimensions.

With the increase in the size of internal combustion engines for use on aircraft, for example, the problem of space limitations has become more and more acute, as it is not possible to increase the dimensions of the forward structure of an airplane in the same proportion as the capacity of the power plant is increased. Thus, for example, in order to install one of the newer types of high capacity, "in-line" engines in the forward compartment of a modern airplane fuselage, it is necessary to utilize such a large proportion of said forward compartment for the engine proper, that there remains for installation of auxiliary equipment, such as engine starting mechanism, a space that is not sufficiently deep along the axis of the engine to accommodate a starting mechanism of the type ordinarily employed in an aircraft power plant of this character.

An object of the present invention, therefore, is to provide an engine starting mechanism of sufficient power to impart initial rotary movement to the crankshaft of an engine of this character and yet of sufficiently small dimensions, particularly along the axis of said engine, to permit the mounting of said starting mechanism within the space that remains free in the engine compartment after installation of the engine itself.

Another object of the invention is to provide an engine starting mechanism constructed in such a manner as to facilitate the separation thereof into component units so that one or more of said units may be removed or partially disassembled for inspection or other desired purposes without necessarily disturbing the remaining component parts.

A further object of the invention is to provide an engine starting mechanism in which an electric motor or its equivalent is employed as the prime mover agency under ordinary conditions while under other conditions the mechanism may be energized manually or by use of emergency energizing equipment engageable with a portion of the starting mechanism to operate the latter independently of any energization of the prime mover normally employed.

Other objects and features of the invention will become apparent upon examination of the following specification and the accompanying drawings wherein is shown schematically the preferred embodiment thereof. It is to be understood, however, that the drawings are merely illustrative of the invention and that they are intended to cover equivalent embodiments falling within the invention scope as defined in the appended claim.

In the drawings:

Fig. 3 is a side elevation view, looking from the right of Fig. 1.

Figure 1:
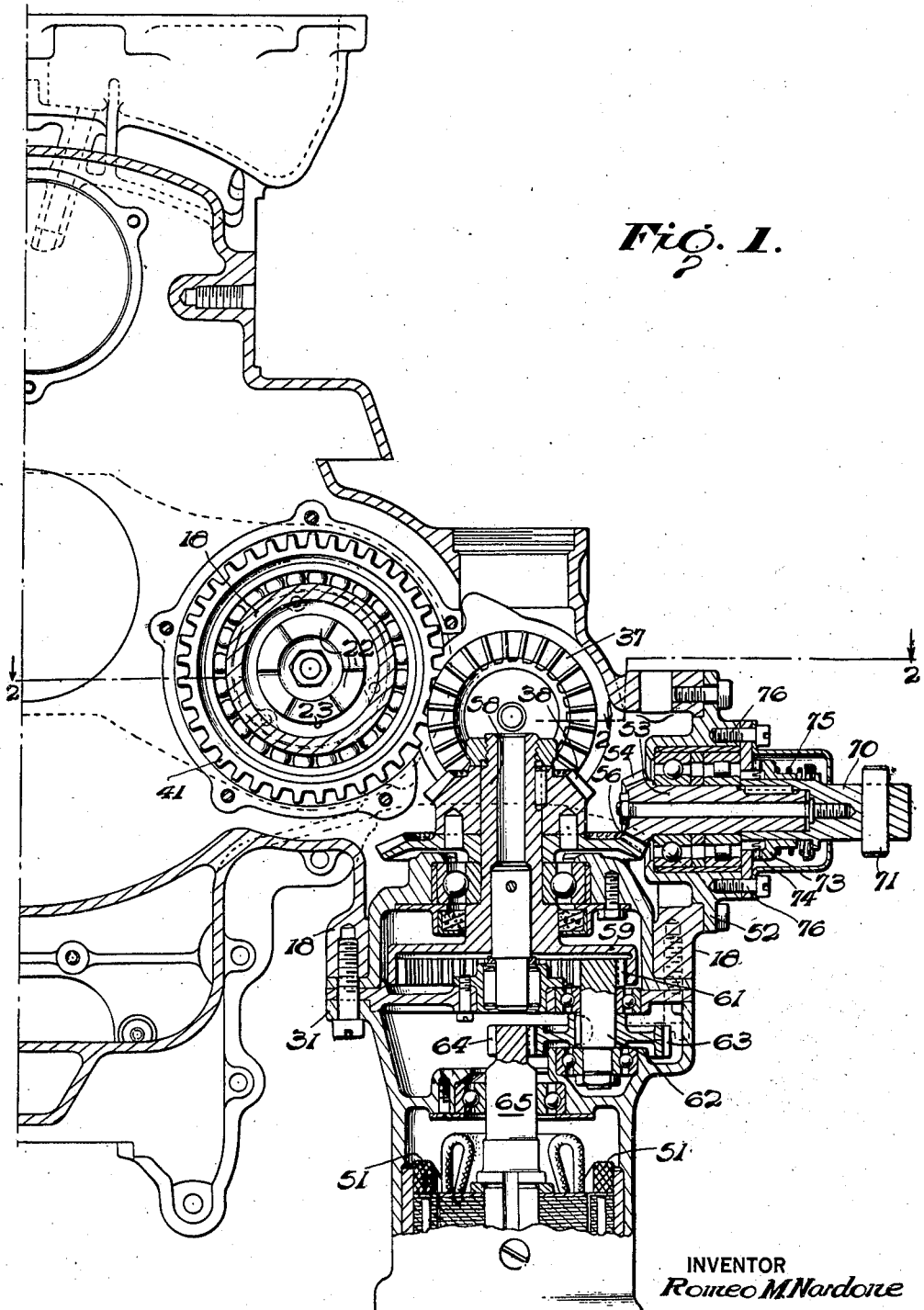
Fig. 1 is a transverse sectional view of the engine, along the longitudinal axis of the starting mechanism therefor.
Figure 2:
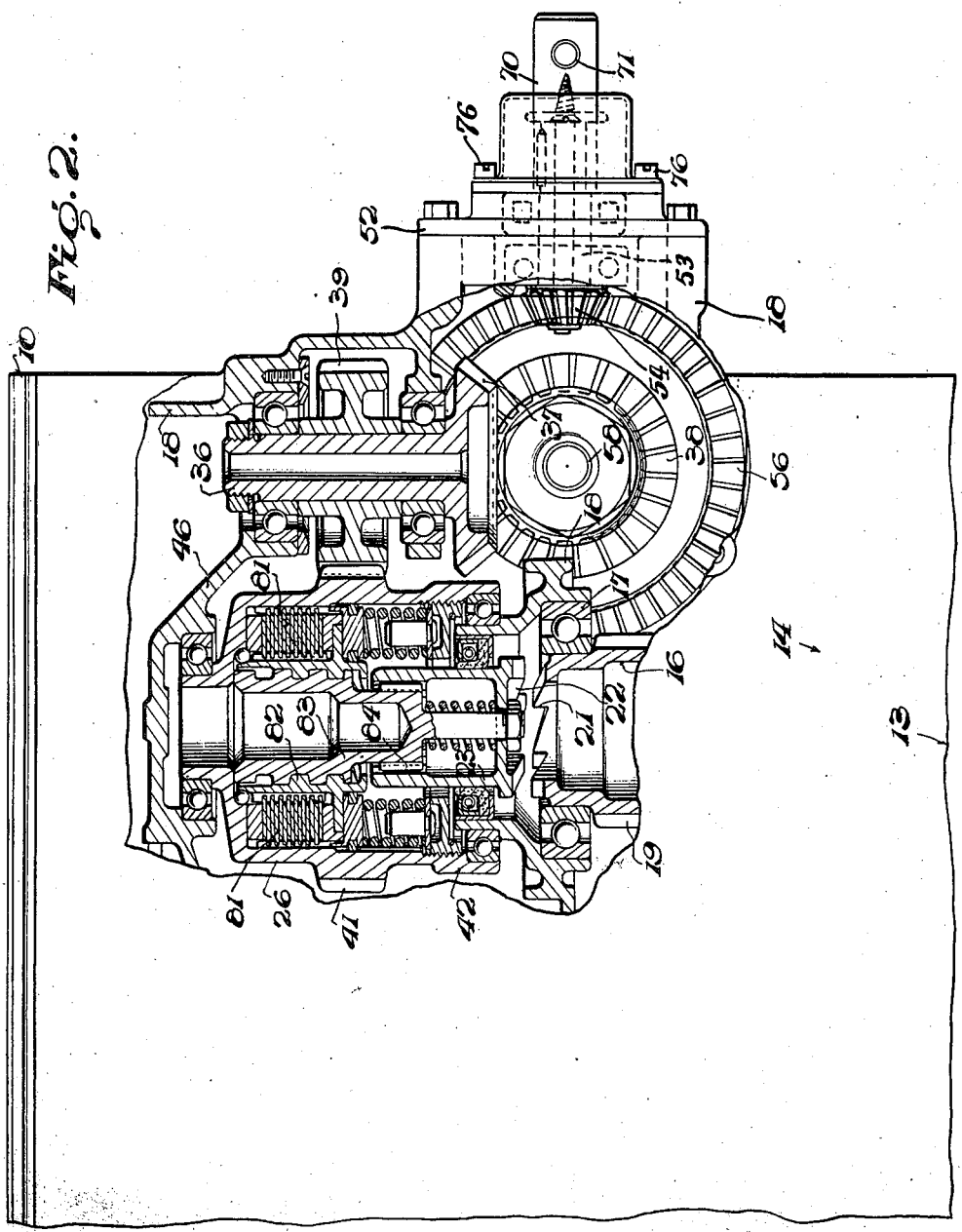
Fig. 2 is a sectional view along the line 2—2 of Fig. 1.

In both Figs. 1 and 2 the parts of the engine starting mechanism are shown in their relationship to the supporting framework (crank-case) of the engine to which the starting mechanism is applied.

In the drawings, reference character 10 designates the rear-most flange of the framework of the crank-case of an internal combustion engine of the "in-line" type; the said framework, including a circular opening 11 adapted to receive the engine crankshaft (not shown) which crankshaft is provided with a suitable circular portion having teeth adapted to mesh with the teeth 19 which are shown in Fig. 2 as being formed on the external surfaces of a hollow rotatable element 16 (Fig. 2) supported in a suitable bearing 17 disposed in the framework 18 of the engine crank-case 14. In other words the teeth 19 of the rotatable element 16 constitute the means for establishing driving connection with the engine crankshaft. The member 16 is also provided with clutch teeth 21 of the unidirectional or ratcheting type disposed in line with and adapted for engagement by the corresponding teeth 22 of the hollow cylindrical engine engaging member 23 which is normally out of engagement therewith as indicated in Fig. 2; the said engine engaging element 23 being also shown in Fig. 1.

As shown, the engine engaging element 23 is a part of a separable unit which is designated generally by the reference character 26 in Fig. 1, which unit includes a number of parts rotatable about the axis of the engine member 16, which axis is parallel to the longitudinal axis of the crankshaft supporting surface 11 of the crank-case 14; but due to the fact that there is only a limited free distance in this axial direction between the flanges 10 and 13 of the crank-case 14, it will be seen that the unit 26 is necessarily of relatively short dimensions axially, and the remaining space is insufficient to accommodate—if arranged in the usual manner—the relatively larger portions of the starting mechanism including the prime mover and the driving connections extending therefrom. The prime mover is designated generally by the reference character 51 in Fig. 1, and it will be seen that the unit 51 is disposed in such manner, in relation to the unit 26 and the engine crank-case 14, that the longest dimension thereof is along a line which is at right angles to the plane of unit 26, and offset therefrom, while its transverse dimensions are approximately the same as the longitudinal dimensions of the unit 26 and are therefore sufficiently small to permit mounting of the unit in the space available between the flanges 10 and 13 of the crank-case 14, wherefore the entire engine starting mechanism is disposed in front of the rear-most flange 10 of the crank-case and has no projecting portion whatever extending rearwardly thereof.

In order to integrate the unit 31 with the unit 26, in view of the angular and offsetting relationship therebetween, there is employed a third unit in the nature of an intermediate or connecting unit which is designated generally by the reference character 36 in Fig. 2, and which includes as a principal element a bevel gear 37 adapted for permanent meshing relationship with a bevel gear 38 constituting a part of a larger unit 31; the unit 36 also including a gear 39 adapted to mesh with a corresponding gear 41 which is integral with the outer rotatable cylindrical portion or barrel 42 of the unit 26. As shown, both the units 26 and 36 are supported in bearings received in different portions of the framework 18 of the engine crank-case. These different portions include a section 52 which rotatably receives a shaft 53 terminating in a bevel gear 54 adapted to mesh with a bevel gear 56 which as shown is integrated with the previously described bevel gear 38, the two gears 38 and 56 being keyed or otherwise secured, in the embodiment shown in Fig. 1, to the extending cylindrical portion 58 of an internally toothed gear 59 which is adapted to be driven by a pinion 61 integral with a shaft 62 to which is keyed a gear 63 having permanent mesh with pinion teeth 64 which is shown as integrally formed on the end portion of the armature shaft 65 of the motor 51.

All of the elements just described and the supporting means therefor are shown in Fig. 1 as contained within the major portion 31 of the starting mechanism; and while these elements constitute the normal driving means for the driven section 26 of the unit (and the engine engaging element 23 therein) the shaft 53 constitutes a supplemental or alternatively operable driving means and includes a connecting section 70 and a transversely disposed pin 71 for attachment of a manually operable crank, or alternatively, a power driven clutch mechanism of any desired type such as, for example, a portable motor driven unit of the type shown in my copending application No. 459,819, filed September 26, 1942. In this connection a feature of this alternatively operable driving means is the provision of a unidirectional or ratcheting clutch mechanism, as indicated at 73 and 74 in Fig. 1, which clutch mechanism involves a rotatable ratchet ring 73 urged toward a stationary ratchet ring 74 by suitable means such as the coiled compression spring 75, the element 74 being rigidly secured to the housing by suitable means, such as the screws 76, so that in the event of any tendency of the shaft 53 (and its attached ring 73) to rotate in the direction opposite to the normal driving direction, the parts 53 and 73 will be held against the possibility of such a reverse rotation by reason of the engagement of the locking surfaces of the clutch elements 73 and 74. It follows that when the shaft 53 is operated as the driving means for the starter, it rotates in such a direction that the teeth of ring 73 may overrun those of the stationary clutch element 74—the spring 75 yielding sufficiently to permit such overrunning—and the drive extends from said shaft 53 to the engine engaging member 23 by way of the intervening gear elements 54, 56, 38, 37, 39 and 41, the drive from the gear 41 to the engine engaging member 23 being by way of the torque limiting friction disc assembly 81 and the automatic meshing mechanism including the motion translating nut and screw combination of which the nut is shown at 82 and the screw at 83, the latter being splined in engagement with the engine engaging member 23 as indicated at 84, and the whole constituting a mechanism of the same character as disclosed in my Patent No. 2,002,413 granted May 21, 1935.

During such drive from the alternatively operable means 53, the motor 51 is of course not energized electrically, but will rotate with the drive shaft 53 and connected parts by reason of the positive driving connection between the shaft 58 and the gear combination 38—56.

After the engine has been started by the energy transferred thereto by way of the engaged clutch elements 23 and 19, the latter will overrun the former, and the former will be returned to the disengaged position indicated in Fig. 2 by the reverse screw action of the parts 82 and 83, in the manner well understood in the art.

There is thus provided a mechanism capable of installation in the limited space available, as indicated, which mechanism is separable into units for separate inspection, and operable by alternatively employable means.

It is to be understood that the invention includes not only the use of all the disclosed features in conjunction, one with the other, but also the separate use of any of said features, or any combination thereof, as is indicated by the varying scope of the appended claim.

This application is a substitute for my application No. 356,708, filed September 13, 1940.

What is claimed is:

In combination with an engine crank-case having a centrally disposed cylindrical passage to receive the engine crank-shaft, and a pair of parallel flanges disposed in planes having a transverse relationship to the axis of the crank-shaft, a starting motor mounted on said crank-case intermediate said parallel flanges, an intermediate shaft mounted within said crank-case with its axis of rotation parallel to the axis of rotation of said crank-shaft, said intermediate shaft having gear teeth formed thereon for imparting initial rotation to said crank-shaft when said starting motor is drivably connected thereto, and means responsive to rotation of said starting motor to drivably connect said motor and intermediate shaft, said last-named means including a jaw clutch element and means for translating the rotation of said motor into axial and rotary movement of said jaw clutch element, to cause said jaw clutch element to engage and subsequently rotate said intermediate shaft, and means for mounting said jaw clutch element within said crank-case, in aligned relationship to said intermediate shaft, and in a plane passing through said starting motor.

ROMEO M. NARDONE.